Feb. 22, 1944. M. D. STAHL Re. 22,445

SUCTION CLEANER

Original Filed April 8, 1939 2 Sheets-Sheet 1

INVENTOR

Maurice D. Stahl

BY

Harry S. Drucker

ATTORNEY

Feb. 22, 1944. M. D. STAHL Re. 22,445

SUCTION CLEANER

Original Filed April 8, 1939 2 Sheets-Sheet 2

INVENTOR

Maurice D. Stahl

BY

Harry S. Dumarse

ATTORNEY

Reissued Feb. 22, 1944

Re. 22,445

UNITED STATES PATENT OFFICE 22,445

SUCTION CLEANER

Maurice D. Stahl, North Canton, Ohio, assignor to The Hoover Company, North Canton, Ohio, a corporation of Ohio Original No. 2,260,237, dated October 21, 1941, Serial No. 266,721, April 8, 1939. Application for reissue April 20, 1942, Serial No. 439,779

11 Claims. (Cl. 183—36)

This invention relates to improvements in suction cleaners and more particularly to an improved form of muffler for suction cleaners serving to reduce the noise due to the rush of air through the suction system.

One practical method of reducing so-called airflow noises is to provide a muffler extending beyond the outlet from the fan chamber and consisting of a tubular member lined with a suitable absorbing material. However, there are certain practical limitations in the use of mufflers, particularly when adapted to a cleaner having a pivotally mounted handle supporting the outer end of a dirt bag. In such an arrangement, the muffler extended within the dirt bag becomes a definite obstruction to the free movement thereof as it swings with the handle unless the muffler be made sufficiently flexible to bend with the bag and then it is very likely to kink, thus closing off the discharge passage entirely.

Therefore, the object of the present invention is to provide an improved muffler arrangement whereby the effective area of sound-absorbing surface is obtained without unduly extending its length into the dirt bag. Briefly, this result is obtained by including a portion of the muffler within the exhaust passage leading from the fan chamber and connecting it with the external portion through an intermediate flexible section, so that the muffler becomes an articulated unit. And aside from the advantage of decreased length of muffler throughout its external portion, there is the further novel feature of treating the normal cleaner exhaust passage for noise-reduction for it is in this region that a considerable part of the noise is created, due to the turbulence set up by the sudden change of velocity of the air leaving the fan chamber.

A preferred embodiment of the invention will now be described in connection with the accompanying drawings, in which.

Figure 1:
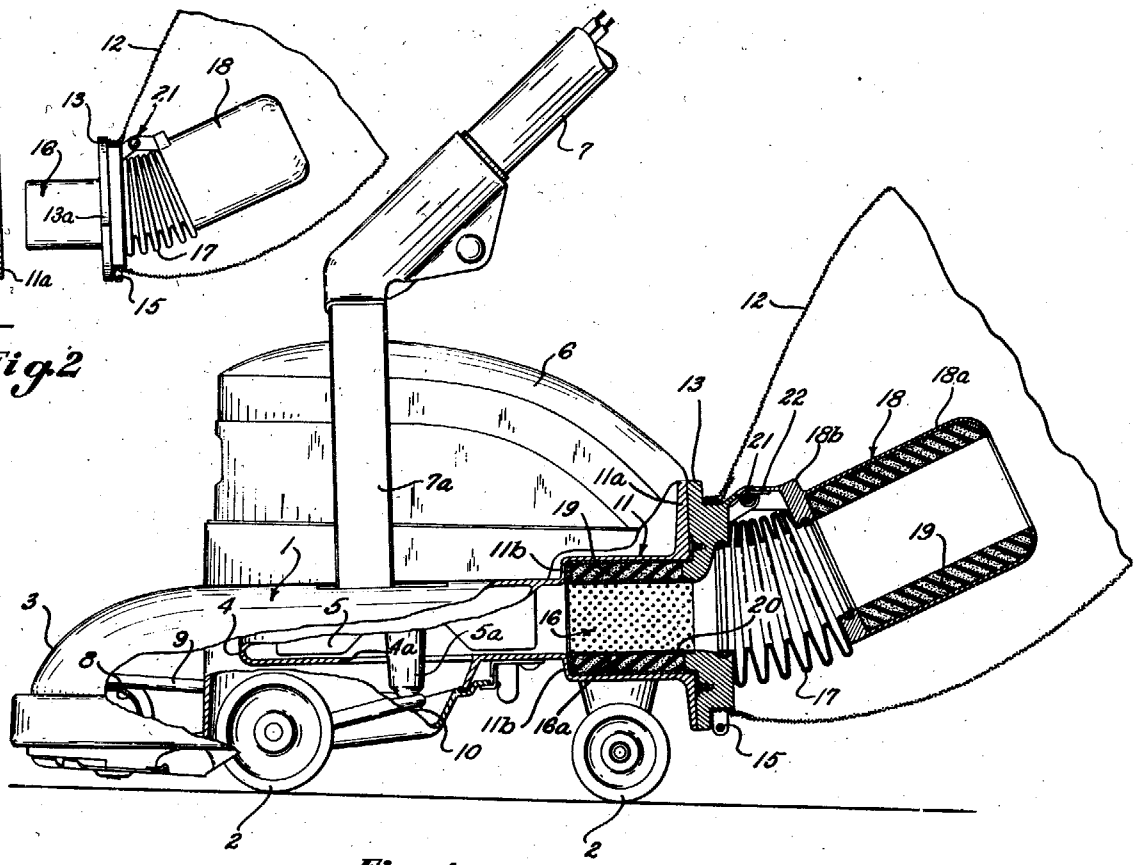
Figure 1 is a general view in side elevation of a typical suction cleaner with portions broken away to show the suction system and the articulated muffler arrangement.
Figure 2:
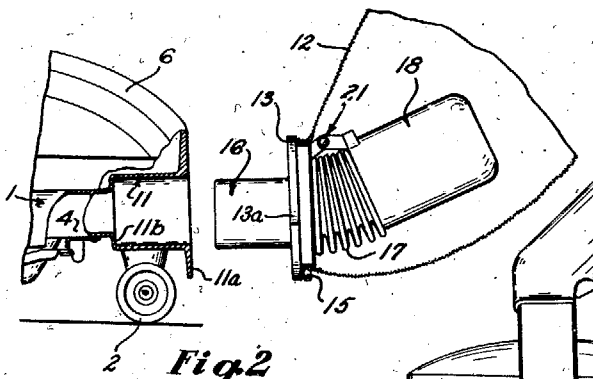
Figure 2 is a view similar to Figure 1 showing the dirt bag and muffler assembly removed from the cleaner.

The suction cleaner herein disclosed and to which the improved articulated muffler is particularly adapted, is of the standard design wherein the cleaner body is supported upon wheels to be maneuvered over the carpet surface by means of a handle having pivotal connection with the cleaner body.

The cleaner comprises generally, a casing 1 supported upon pairs of front and rear wheels 2, 2 and includes a nozzle portion 3 extending across its forward end. A fan chamber 4, located centrally of the casing 1, houses a fan 5 driven by a motor concealed beneath the removable dome-like cover 6 supported upon the casing 1. The handle 7 is provided at its lower end with an inverted U-shaped bail 7a which straddles the motor cover 6 and has pivotal connection with the cleaner casing. The handle is free to swing forwardly and rearwardly as the cleaner is maneuvered over the carpet surface with the customary reciprocating motion.

Referring now in greater detail to the suction-creating system, the nozzle portion 3 has the form of a chamber with a downwardly opening suction mouth and is normally spaced in cleaner operation in close proximity to the carpet surface. An air passage extends rearwardly from the nozzle chamber and communicates with the fan chamber through an annular inlet opening or eye 4a in its bottom wall. By preference, a rotary carpet-contacting member 8 is mounted in the nozzle chamber and is driven by means of a belt 9 extending rearwardly through the air passage from the nozzle and having driving connection with the fan 5 through a pulley 10 formed at the lower end of an extension 5a of the fan hub.

Extending rearwardly from the fan chamber and slightly oblique to the longitudinal center line of the cleaner body is the exhaust passage 11 through which the dirt-laden air is discharged into a dirt bag 12 of the usual porous fabric construction having its lower end detachably connected to the discharge outlet of the fan chamber and its outer end suspended from the handle 7. The extreme rear end of the exhaust passage 11 is preferably flanged at 11a to provide a seat to which the dirt bag supporting ring 13 is removably clamped.

Figure 3:
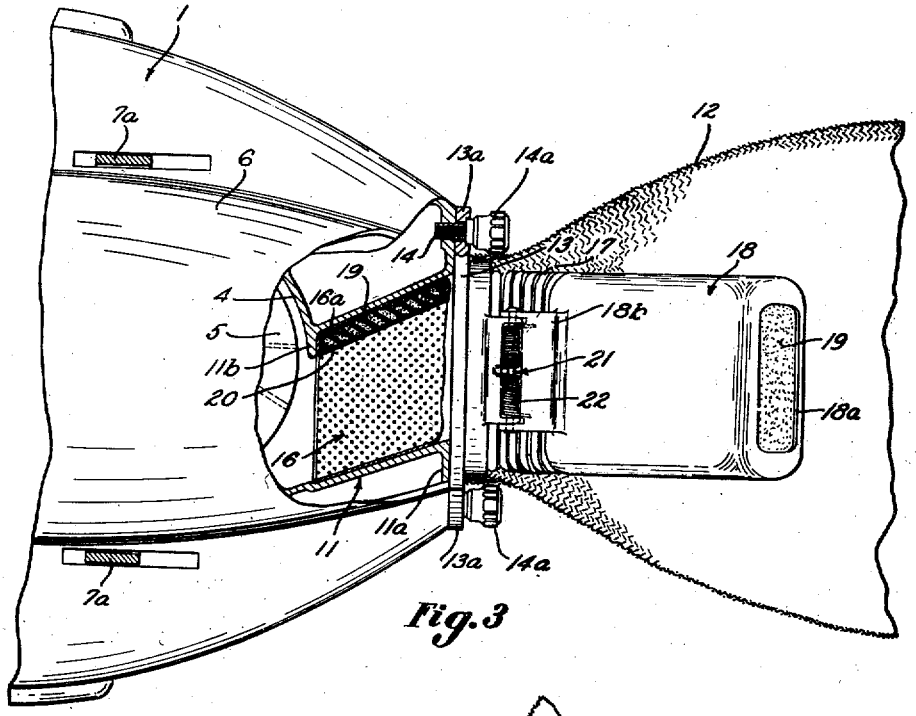
Figure 3 is a top plan view of the rear end portion of the cleaner with portions broken away to show the muffler arrangement.

In the present disclosure, this bag ring 13 is incorporated in the muffler assembly, but considered merely as an attaching fitting for the mouth portion of the bag 12, it has the general form of a ring which fits flush against the flanged outlet connection 11a at the rear end of the cleaner body and is provided on opposite sides with hook-shaped lugs 13a, 13a which fit over rotatable bolts 14, 14 projecting rearwardly from the face of the flanged outlet connection and having ornamental heads 14a, 14a, as shown in Figure 3. The mouth of the bag 12 is secured around the ring 13 in any suitable manner as for instance, by means of a metal clamping ring 15 inserted in the mouth of the bag and seating on a shoulder on the outer face of the ring.

Referring again to the discharge outlet passage 11, the same leads rearwardly from the fan chamber in a direction slightly oblique to the longitudinal axis of the cleaner body, so that the dust-laden air leaves the fan chamber in a path generally tangential to the periphery of the fan. Immediately beyond the port in the fan chamber defined by the entrance to the exhaust passage, the latter undergoes an abrupt increase in its horizontal and vertical cross-sectional dimensions as indicated by the rearwardly facing shoulders 11b formed just beyond the port. Moreover, the exhaust passage 11 is rectangular in cross section, somewhat elongated horizontally and having a slight divergence toward its outer end as shown in Figure 3.

Now, the increase in the dimensions of the exhaust passage 11 beyond that otherwise necessary for handling the air discharged from the fan chamber is a matter of approximately an inch in each direction, this enlargement making possible the accommodation of a portion of the muffler which preferably forms a part of a detachable bag and muffler assembly now to be described in detail.

Generally, the muffler has the form of a tubular member consisting of an outer shell and an inner lining composed of a relatively thick layer 19 of any suitable sound-absorbing material such as sponge rubber, cellulose padding or like material.

In the muffler arrangement disclosed, a sectional construction has been adopted so as to introduce a certain degree of flexibility intermediate its end portions and for the reasons already mentioned. Thus, as clearly shown in Figure 1, the muffler proper is made up of an internal section 16 extending forwardly from the bag supporting ring 13 and into the enlarged exhaust passage 11. Rearwardly beyond the internal section is a flexible bellows-like section 17 extending a short distance beyond the supporting-ring 13 and finally, there is an external section 18 which projects into the lower end portion of the dirt bag 12 and is inclined slightly in an upward direction following generally the inclination of the bag itself.

Referring now to some of the details of construction of the muffler, the internal section 16 which fits into the enlarged exhaust passage 11, includes the outer metallic shell 16a enclosing its portion of the sound-absorbing member 19 and suitably fastened to the supporting ring 13. In addition to the enclosing metallic shell 16a, the internal section 16 is preferably provided with a perforated sheet metal inner liner 20 as a protector for the soft sound-absorbing material against the severe abrasive effect of the dirt particles and other objects discharged from the fan chamber. In fact, along one side of the exhaust passage, as shown in Figure 3, it may be desirable to omit the sound-absorbing lining entirely, because of the likelihood of pins and other pointed objects being driven against the surface with such force as to penetrate the perforations and become firmly embedded in the sound-absorbing material. However, the treatment of the sound-absorbing surface throughout the exhaust passage is a matter of choice, although it can be stated that the use of a perforated sheet metal liner does not reduce the effectiveness of the sound-absorbing layer materially.

In any case, the internal section 16 extends through the supporting ring 13 where it joins the short angular flexible section 17 which preferably consists of a bellows constructed of a suitable flexible sheet material, so that it can flex readily through a limited angle in the movement of the outer section 18.

The outermost section 18 is essentially a continuation of the intermediate flexible section 17 and includes the greater length of the sound-absorbing material, but preferably omits the perforated metal lining, it being assumed that the material is capable of withstanding the abrasive effect of the dirt particles throughout this portion of the muffler. In any case, the outer section is of rigid construction by reason of its enclosing metal shell 18a which houses and supports the sound-absorbing material 19. And finally, it is preferred to increase slightly the diameter of the air passage throughout the flexible and outer muffler sections 17 and 18 so as to reduce any tendency for the creation of a back-pressure by reason of any restrictive effect on the muffler.

Owing to the weight of the extended outer muffler section 18, it is further desirable to support it upon the ring 13 by means of a suitable hinged connection as at 21, just above the flexible section 17. The hinge may be of any simple construction, as a pin, joining the ends of short arms projecting toward each other from the upper edges of the ring 13 and the corresponding point of a ring-like frame member 18b at the base of the outer shell 18a forming the body of the outer muffler section 18. A torsion spring 22 is incorporated in the hinge and acts to support the weight of the flexibly supported muffler section 18.

Figure 4:
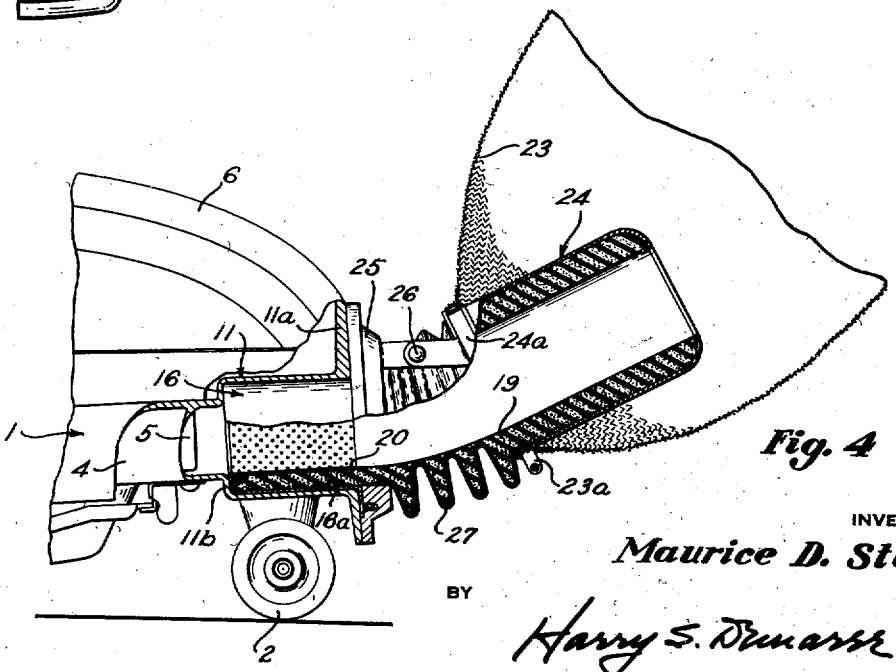
Figure 4 is a view in side elevation of the rearmost section of the cleaner showing a modified arrangement in which the dirt bag is mounted upon the outer section of the muffler rearwardly of the flexible section rather than forwardly thereof as shown in Figure 1.

A possible modification or alternative muffler and dirt bag arrangement is disclosed in Figure 4 wherein a principal change is the mounting of the lower end of the bag 23 around the base of the outermost section 24 of the muffler, rather than upon the bag-supporting ring 13, as is the case in Figure 1. In other words, the dirt bag 23 is now supported upon the hinged portion of the muffler and therefore swings with it rather than being fixed to the cleaner casing. This provides for a somewhat more flexible construction, but at the same time exposes the intermediate flexible portion of the muffler, as well as the hinged connection between the outer muffler section 24 and the supporting ring 25. Ring 25 is similar to the supporting ring 13 shown in Figure 1, except that the seat for the bag mouth is omitted, this having been transferred to the annular base 24a of the hinged muffler section which is now formed with an annular channel about which the bag mouth is clamped through the medium of the same type of clamping ring 23a as used in the previous arrangement. A second principal change comprises the provision of a continuous sound-absorbing lining 19 which extends the entire length of the muffler assembly including the bellows-like central part instead of merely within the inner and outer sections as in the first embodiment.

With the bag supported upon the hinged portion of the muffler, it may be necessary to provide a more substantial hinged connection at 26 and to use a stronger torsion spring at the hinge. This is a detail which can be readily taken care of in the design of the muffler mounting. As the sound-absorbing liner 19 extends the entire length of the muffler it must be capable of flexure between the inner and outer sections at the bellows 27. With the flexible portion of the muffler exposed to view and also to a greater degree of wear, it is preferable to enclose the flexible section of the sound-absorbing material within a short bellows member 27 formed of some suitable sheet material, into which the sound-absorbing material is pressed or molded, but otherwise maintaining its continuity throughout the full length of the muffler. In other respects the bag and muffler are assembled and removably attached to the outlet connection from the cleaner, in the same manner as hereinbefore described.

From the foregoing description, the advantages of the muffler arrangements hereinbefore mentioned will be readily appreciated. In the first place, the over-all length of the muffler has not been sacrificed although the effect of decreased length has been attained by inserting a portion of its length into the body of the cleaner and throughout the exhaust passage which ordinarily is not treated for noise reduction. Another advantage is the practical application of a muffler to a cleaner of the type in which the handle swings relatively to the cleaner body and supports the outer end of the bag, thus introducing considerable flexing at the mouth portion of the bag and otherwise making it quite impractical to use a muffler of any considerable length.

And finally, with the muffler forming an integral part of the bag assembly, it is possible to make renewals and replacements quite easily, inasmuch as the muffler is removable from the cleaner as a unit and hence readily accessible. In fact, this arrangement lends itself to the use of a muffler unit capable of being assembled as a part of the bag mounting, either for ready replacement in case of wear, or, in the event that it is deemed desirable to provide mufflers as optional equipment, to be attached or not as the user desires.

Thus, without limiting the invention to the specific features of construction herein disclosed, I claim:

1. In a suction cleaner, the combination with suction-creating means including a fan chamber having a passage leading to the exhaust outlet therefrom, of a muffler comprising a tubular member of sound-absorbing material and adapted to be attached at said exhaust outlet with a portion of its length extending into said passage to form a sound-reducing lining therefor.

2. In a suction cleaner, the combination with suction-creating means including a fan chamber having an exhaust passage of substantially increased transverse dimensions leading to a flanged outlet, of a muffler comprising a relatively thick tubular body of sound-absorbing material adapted to be attached to said flanged outlet with a portion of its length extending throughout the length of said exhaust passage and forming a conduit for the air discharged from said fan chamber.

3. In a suction cleaner, the combination with suction-creating means including a fan chamber having an exhaust passage of substantially increased transverse dimension leading to a flanged outlet, of a muffler comprising a tubular body of sound-absorbing material adapted to be attached to said flanged outlet with a portion of its length conforming to the contour of said exhaust passage and adapted to extend into and throughout the length thereof to form a conduit for the air discharged from said fan chamber.

4. In a suction cleaner, the combination of suction-creating means including a fan chamber having an exhaust passage, and a muffler comprising a tubular member of sound-absorbing material having one portion adapted to fit within and forming a sound-absorbing lining for said exhaust passage and another portion extending from and beyond said exhaust passage.

5. In a suction cleaner, the combination of suction-creating means including a fan chamber having an exhaust passage, a dirt bag adapted to be attached to the outlet from said exhaust passage, and a muffler comprising a tubular member of sound-absorbing material divided into sections, one section being adapted to fit within and form a lining for said exhaust passage and the other section projecting beyond the outlet from said exhaust passage and into said dirt bag.

6. In a suction cleaner, the combination of suction-creating means including a fan chamber having an exhaust passage, a dirt bag adapted to be attached to the outlet from said exhaust passage, and a muffler comprising a tubular member with walls of sound-absorbing material having a portion extending throughout the length of said exhaust passage and a portion projecting beyond said outlet and into said dirt bag, and means for attaching said muffler at said outlet.

7. In a suction cleaner, the combination of suction-creating means including a fan chamber having an exhaust passage and a flanged outlet connection, and a muffler comprising a tubular member having a lining of sound-absorbing material and divided into flexibly connected sections, one section being adapted to fit within said exhaust passage with the other section projecting from and beyond said outlet, and a fitting carried by said muffler for detachably connecting the same to said outlet connection.

8. In a suction cleaner, the combination of suction-creating means including a fan chamber having an exhaust passage substantially enlarged diametrically and a flanged outlet connection, a dirt bag adapted for detachable connection at said outlet connection, and a muffler comprising a pair of flexibly connected sections consisting of substantially rigid tubular members lined with suitable sound-absorbing material, one of said sections being adapted to fit within the enlarged exhaust passage to form a sound-absorbing lining therefor and the other section projecting beyond said outlet connection and into said dirt bag, and an attaching fitting intermediate the flexibly connected sections of said muffler for connecting the same to said flanged outlet connection.

9. In a suction cleaner of the type having an ambulatory body including air-moving means, and a dust bag; an articulated sound-absorbing muffler comprising longitudinally spaced sections each consisting of a rigid metallic casing lined with sound-absorbing material and means pivotally interconnecting said sections and including rigid hinge means and a flexible bellows-like conduit, one of said sections being fixedly carried directly by said body and forming a part of the exhaust outlet of said air-moving means and the other extending movably therefrom, said bag enclosing said last mentioned section and said bellows-like conduit.

10. In a suction cleaner of the type having an ambulatory body including air-moving means, and a dust bag; an articulated sound-absorbing muffler comprising longitudinally spaced sections each consisting of a rigid metallic casing lined with sound-absorbing material and means pivotally interconnecting said sections and including rigid hinge means and a flexible bellows-like conduit, one of said sections being fixedly carried directly by said body and forming a part of the exhaust outlet of said air-moving means and the other extending movably therefrom, said bag enclosing and being movable with said last mentioned section.

11. In a suction cleaner of the type having an ambulatory body including air-moving means, and a dust bag; an articulated sound-absorbing muffler comprising longitudinally spaced sections each consisting of a rigid metallic casing, means pivotally connecting said sections and including rigid hinge means and a flexible bellows-like conduit, a sound-absorbing lining extending the full length of said muffler including said bellows-like conduit, characterized in that one of said sections is carried directly by said body and forms a part of the exhaust outlet of said air-moving means and in that the other section is enclosed by said bag which is movable therewith.

MAURICE D. STAHL.